United States Patent [19]

Kaiser et al.

[11] Patent Number: 5,065,154
[45] Date of Patent: Nov. 12, 1991

[54] DIGITALLY ADDRESSBLE ELECTRONIC DEVICE WITH INTERCHANGED AND INVERTED ADDRESS LINES

[75] Inventors: Winfried Kaiser, Nufringen; Andreas Schober, Hanover; E.-Peter Salfeld, Ehningen, both of Fed. Rep. of Germany

[73] Assignee: Hewlett-Packard Company, Palo Alto, Calif.

[21] Appl. No.: 340,981

[22] Filed: Apr. 20, 1989

[30] Foreign Application Priority Data

May 5, 1988 [EP] European Pat. Off. ........ 88107187.2

[51] Int. Cl.$^5$ .............................................. H04Q 5/14
[52] U.S. Cl. ......................... 340/825.520; 340/825.07; 340/286.07
[58] Field of Search ....................... 340/825.52, 825.53, 340/825.07, 825.08, 573, 286.07; 370/85.11, 85.8

[56] References Cited

U.S. PATENT DOCUMENTS 4,016,369 5/1977 Petersen ............................. 370/85.11
4,679,192 7/1987 Vandbrabant ..................... 370/85.11

OTHER PUBLICATIONS

"Basic Electronics Technology", Evans et al., 12/1985, p. 282.

Primary Examiner—Donald J. Yusko
Assistant Examiner—Edwin C. Holloway, III
Attorney, Agent, or Firm—Richard F. Schuette

[57] ABSTRACT

In a system comprising a plurality of digitally addressable electronic devices, all devices have the same construction and are designed for being connected in series to a common central monitoring station. The addressing of these devices is accomplished by a plurality of address lines which are connected to input contacts of the respective device. Within each device, a selection gate is connected to the input contacts which provides an enabling signal if the signal on said address lines has a predetermined bit pattern. Each device has output contacts connected to its input contacts to which the input contacts of a next device are connected. The address lines are connected from the input contacts to the output contacts of the device in such a way that the contacts are interchanged, and an inverter is inserted in one of said lines so that the bit pattern forming the address provided at the output contacts is different from the bit pattern received at the input contacts. Thus, along the system of series connected devices a plurality of different bit patterns is produced so that the position of the correct bit pattern to which the device selection means responds, is shifted along the series connected devices in order to address the device which is in a predetermined position. A preferred application of such devices is in medical surveillance systems in which a plurality of racks are connected serially together and to a center monitoring station, each rack being allocated to a different task and including the units which are needed to monitor the vital functions of a patient required for that task.

13 Claims, 4 Drawing Sheets

|  1.RACK | 2.RACK | 3.RACK | 4.RACK | 5.RACK | 6.RACK | 7.RACK | 8.RACK |
|---|---|---|---|---|---|---|---|
| 0 | 0 | 0 | 0 | 1 | 1 | 1 | 1 |
| 0 | 0 | 0 | 1 | 1 | 1 | 1 | 0 |
| 0 | 0 | 1 | 1 | 1 | 1 | 0 | 0 |
| 0 | 1 | 1 | 1 | 1 | 0 | 0 | 0 |

DIGITALLY ADDRESSBLE ELECTRONIC DEVICE WITH INTERCHANGED AND INVERTED ADDRESS LINES

BACKGROUND OF THE INVENTION

Digitally addressable electronic devices are generally connected to a bus system in parallel and include gate means which respond to an address in form of a specific bit pattern which is transmitted via address lines included in said bus. In such a system it is necessary to individually set the gate means included in such an addressable device to a specific address. In a system, which includes a plurality of different, addressable devices which may be repeatedly exchanged, this kind of addressing is cumbersome and may lead to trouble which is caused by errors in setting the gate means. Such trouble may become very serious when the digitally addressable electronic devices are medical apparatuses used for monitoring body functions of seriously sick persons so that a failure in monitoring may have lethal consequences.

BRIEF SUMMARY OF THE INVENTION

Thus, it is an object of the invention, to provide a digitally addressable electronic device which may be used in a larger system including a plurality of such devices, and which device is addressable independently of any setting of address registers, gate means and so on.

If a plurality of devices according to the invention is connected in series, the bit pattern forming the address is modified therein, so that the bit pattern received by the second device is different from the bit pattern received by the first device. Similarly, the third device in series receives a bit pattern defining an address which is again different from the bit patterns received by said first and second devices. Thus, depending on the number of address lines and the methods used for modifying the bit pattern, a plurality of different bit patterns defining different addresses may be produced along the series connection of a plurality of devices. It then depends on the position of the device in this series connection whether or not the address received by this device corresponds to the bit pattern to which the device selection means responds. Thus, the address of each device depends on its position in the series although all devices may respond to the same bit pattern.

The number of devices which may be connected in series and definitely addressed depends on the number of address lines and of the means used in each device for modifying the address. In addition to interchanging lines an inverter may be inserted in at least one of the lines connecting input and output means of the device.

In a preferred embodiment of the invention, the device comprises input means having a first plurality of N contacts and output means having a second plurality of N contacts, N being an integer. Each contact bears a designation n, n being an integer defined as $1 \leq n \leq N$. Each $n^{th}$ contact of the first plurality of contacts is directly connected to the $(n+1)^{th}$ contact of the second plurality with the exception of the $N^{th}$ contact of the first plurality which is connected to the $1^{st}$ contact of the second plurality via an inverter. The number of addresses which may be defined in this way is 2N. Thus, in the simplest case of only two address lines, four devices may be addressed.

In a preferred embodiment of the invention, the device includes a plurality of modules and module selection means for selectively activating each one of said modules. The input means of the device includes a third plurality of contacts for the connection of a further plurality of address lines on which a further address signal may be transmitted, the address signal forming a pattern of parallel bits. Said module selection means includes a plurality of inputs connected to said third plurality of contacts, and a plurality of outputs each one being connected to one of said modules. The module selection means provides an enable signal to a selected one of said modules in response to the bit pattern of said further address signal, the control signal produced by said device selection means being an enable signal connected to said module selection means.

Here again, the module selection means is incorporated into the device and not a portion of the modules themselves. The module selection means addresses the location of the selected module so that here again the address of the module is position-dependent. In preferred embodiments of the invention, provision is made to transmit a warning signal if a device is addressed which is not connected, and similarly if a module position is addressed which does not include such module. Similarly, provision can be made for producing a signal if a connected device or module does not operate correctly.

As mentioned before, a preferred application of the invention is the field of medical care wherein devices according to the invention may be designed in form of a cabinet or a rack which may be allocated to a single patient and which receives the specific modules which are needed to supervise the body functions of this patient, as for example the heart activity, breathing rate, brain activity and so on. Such racks or cabinets may be connected in series to a central monitoring station from where the plurality of patients may be supervised.

DETAILED DESCRIPTION OF THE INVENTION

Figure 1:
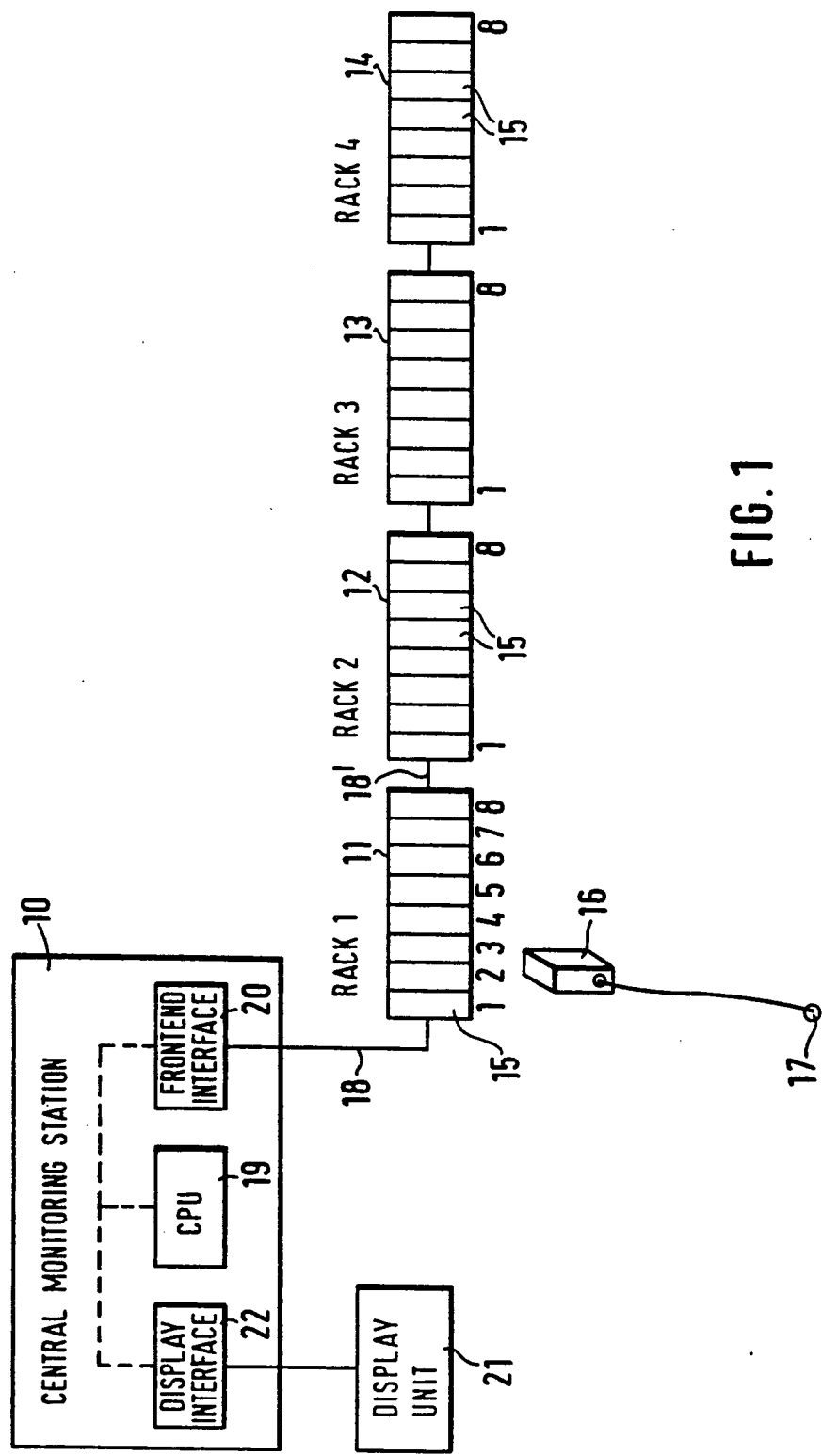
FIG. 1 is a schematic representation of a patient monitoring system comprising devices according to the invention.

FIG. 1 illustrates a patient monitoring system comprised of a centre monitoring station 10 to which four racks 11, 12, 13 and 14 are connected. Each of said racks includes up to eight patient modules 15, one of which is separately shown as a box 16 below the first rack 11. The patient module 16 may include appropriate means to supervise special body functions, as for example pulse frequency, blood pressure, temperature, breathing rate etc., as e.g. a sensor 17 which is connected to the patient module 16 by means of a cable. The racks are serially interconnected and the first rack 11 is connected to the centre monitoring station 10 by means of a cable 18. The centre monitoring station includes control means in form of a central processing unit 19 to which the racks 11 to 14 are connected via front end interface 20, whereas to the CPU of the centre monitoring station a display unit 21 is connected via display interface 22.

Each of the racks 11 to 14 is assigned to a different task. In order to gather the information produced by the different patient modules 15, these modules are successively addressed and sensed so that the corresponding data are successively received in the centre monitoring station, where the sensed information is processed for being displayed on display unit 21. In order to address the plurality of racks, the cable 18 connecting the first rack 11 to the centre monitoring station 10 as well as the cables connecting serially the different racks 11 to 14 include a plurality of address lines as well as transmitting and receiving lines, the transmitting line T being used to send signals from the centre monitoring station 10 to the addressed patient module whereas the receiving line is used to transmit signals from said patient modules to the centre monitoring station.

Figure 2:
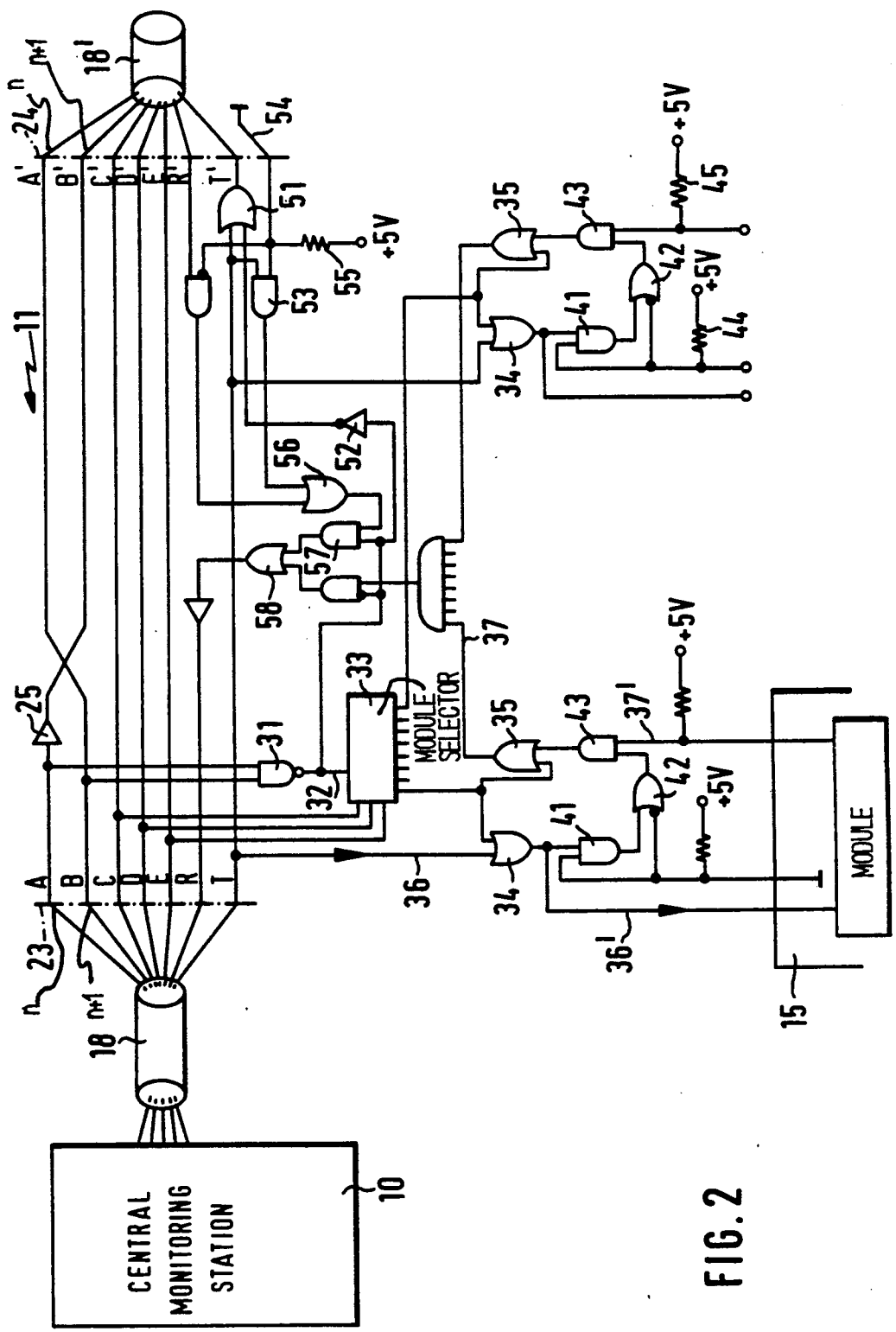
FIG. 2 is the circuit diagram of a device used in the system shown in FIG. 1.

As shown in the circuit diagram of FIG. 2, the cable 18 connecting the first rack 11 to the centre monitoring station includes seven lines, i.e. a first plurality of two address lines A and B, a second plurality of three address lines C, D and E, a transmitting line T and a receiving line R. Each rack has input means 23, for example in form of an appropriate plug and socket connection. A similar connection forms output means 24 allowing the connection of rack 1 via a cable 18' to the next serially connected rack 12.

In the device of FIG. 2, to address lines A, B a NAND-Gate 31 is connected which produces at its output line 32 an enabling signal if the signals on address lines A, B connected to its inputs are both a logic 1. Only if the module selection unit 33 receives the said enabling signal, it produces at one of its output lines an enabling signal for the associated module 15. The addressed module is determined by the signal present on address lines C, D and E which is connected to the inputs of said module selection unit 33.

Figure 3:
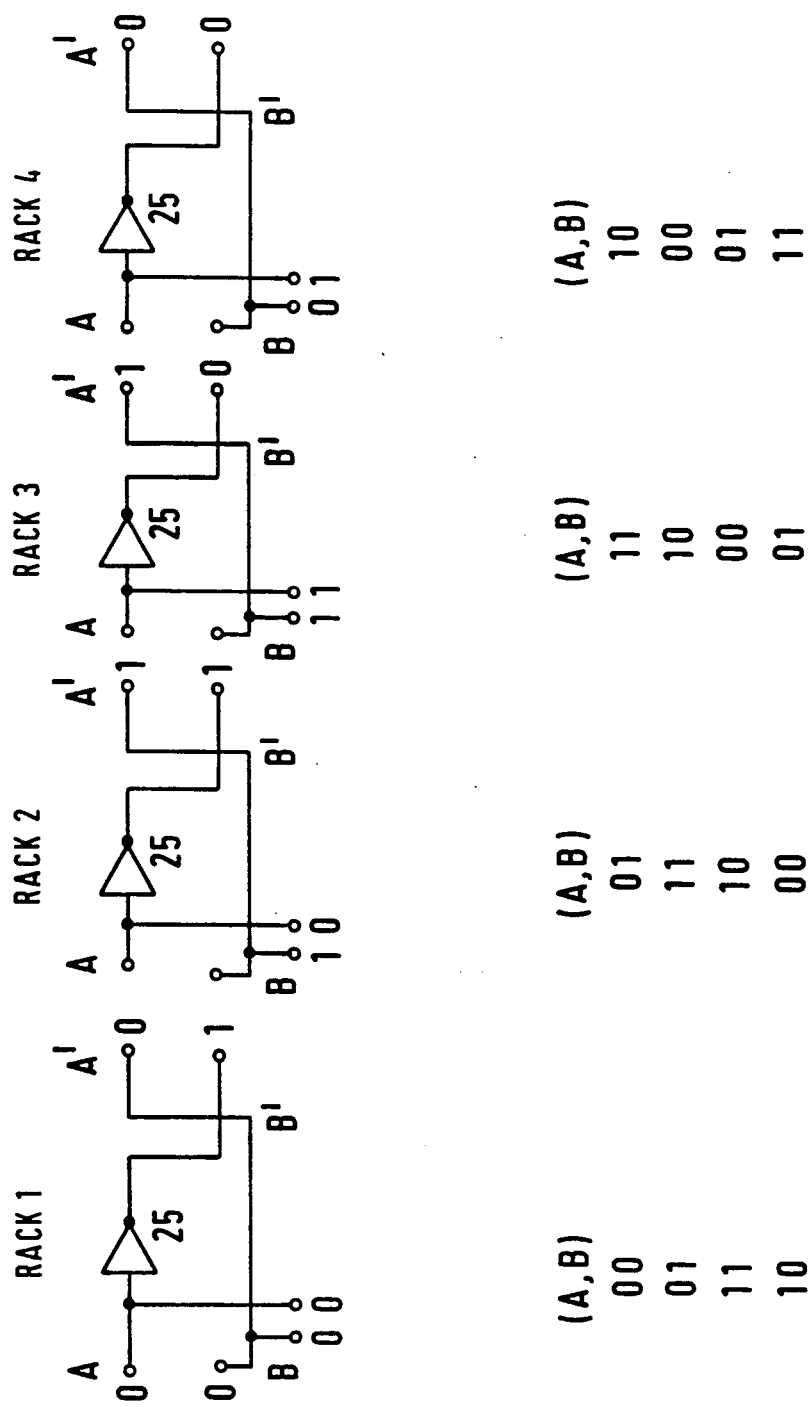
FIG. 3 is a schematic presentation of the rack addressing scheme used in the system shown in FIG. 1.

In the system shown in FIG. 1, all racks 11 to 14 are similar. Thus, each rack is addressed if the signal on address lines A and B connected to the input connection 23 has the bit pattern 1,1. Nevertheless, a selection can be made since the address signal is modified when passing through the device because of the address line B at input connection 23 being connected to the contact A' of the output connection 24, whereas the address line A at input connection 23 is connected to contact B' at the output connection 24 via an inverter 25. The result of this measure is that the bit pattern which forms the rack address provided at the output connection 24 is different from the bit pattern fed to the input connection 23. This is shown in more detail in FIG. 3. If at the input connection of rack 1 the bit pattern O,O is present, the crossing of the lines and the insertion of the inverter 25 produces at contacts A', B' of the output connection the bit pattern 0,1 which is concurrently the bit pattern at the input connection of rack 2 to which said rack responds. Similarly, the bit pattern 0,1 at the input of rack 2 is transformed into the bit pattern 1,1 at the output of this rack. Thus, at the input of rack 3 the bit pattern 1,1 is present which then is transformed into bit pattern 1,0 at the output of rack 3, which bit pattern is transmitted to the input of rack 4 and then transformed into 0,0. Thus, a next rack connected to the output of rack 4 would receive the same bit pattern as rack 1 so that an ambiguity would exist with respect to the addressing of rack 1 and such a fifth rack. In consequence thereof, the use of two address lines defining a two-bit pattern limits the system to the use of four racks. Since all devices include as device selection means the NAND-gate 31 which produces an enable signal when it receives a logic 1 at each of its inputs, and since the inputs of the NAND-gate 31 are connected to the address lines A, B at the input connection 23, the NAND-gate 31 of the third rack would receive the bit pattern 1,1 and thus enable rack 3 if at the input of rack 1 the bit pattern 0,0 is present, as shown in FIG. 3. Below the racks 1 to 4 shown in FIG. 3 the bit patterns are indicated which are present at the inputs A, B of the respective racks. These bit patterns show, for example, that for addressing the last rack 4 the bit pattern 1,0 at the input of the first rack must be present.

If a rack is correctly addressed and the module selection unit 33 enabled so that it produces a module enabling signal in response to the address connected thereto from address lines C, D, E, the enabling signal of module selection unit 33 is connected to two OR-gates 34 and 35, the first one being inserted into a line 36, 36' connecting the transmitting line T and an input port of module 15, whereas the second OR-gate 35 is inserted into a line 37, 37' connecting an output port of module 15 to the receiving line A. When both gates 34 and 35 are open and the module 15 is present, module 15 is able to respond to signals transmitted from centre monitoring station 10.

The line sections 36' and 37' are connected by a gate arrangement comprised of gates 41, 42, 43 which form a switch connecting the said line sections 36' and 37'. If a module 15 is connected as shown in the left portion of FIG. 2, input lines to gates 41 and 42 are grounded so that these gates 41, 42 form a bar, whereas gate 43 is held open in order to pass the signal emitted by module 15. If, however, an address module is missing as in the right portion of FIG. 2, the inputs of gates 41, 42 are no more grounded but connected to a high level by pull-up-resistors 44 and 45, respectively. Thereby, gates 41, 42 and 43 are opened so that a direct connection between the transmitting and receiving lines exist, returning the transmitted signal immediately to the centre monitoring station 10. This centre monitoring station senses this immediate return of the transmitted signal and thus senses the missing of the addressed module.

Into the portion of the transmitting line T connecting input connection 23 to output connection 24, an OR-gate 51 is inserted which is closed by the enable signal produced by the device selecting NAND-gate 31 and connected to one input of OR-Gate 51 via inverter 52. Thus, the transfer of the transmitted signal to the output connection 24 is blocked when the rack is addressed, whereas it can pass on to the output connection 24 and thus to the next rack if the present rack is not addressed. This means that in any case the transmitted signal is blocked within the addressed device and not passed to the output connection thereof. The transmitting line T is further connected to NAND-gate 53 which has its other input connected to a line 54 which is grounded when another rack is connected, and which is also connected via pull-up-resistor 55 to a high voltage level. Gate 53 forms again a switch which is non conducting when another rack is connected to the output connection 24, but which is closed and thus connects the transmitting line T via gates 56, 57 and 58 to the receiving line, so that a transmitted signal is again immediately sent back to the centre monitoring station in order to indicate that the addressed rack is missing. The arrangement of gates 56, 57, 58 has the purpose to block that transmitted signal if the addressed rack is the last one in the series.

Summing up, the illustrated embodiment of the invention allows a series connection of four racks, each containing up to eight modules. All racks have the same construction, the address of the racks being determined exclusively by their respective position in the series. Similarly, the addresses of the modules are determined only by their position in the rack. Switch means between the transmitting and receiving lines allow to recognize whether or not an addressed rack and/or module is present. If a rack or a module fails in its operation, this may be recognized by a missing or defective response signal. Since no addressing errors can be made and the existence and function of address modules is monitored, the embodiment forms a very secure system which is especially appropriate for medical purposes.

Figure 4:
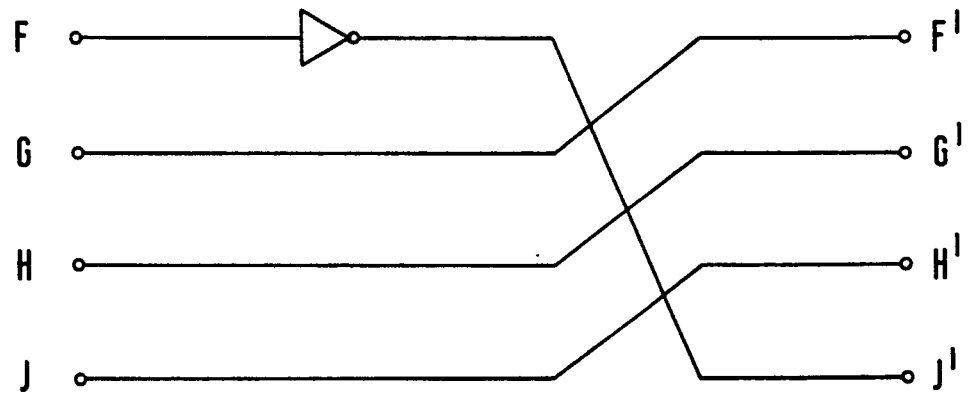
FIG. 4 is a schematic representation of a rack addressing system comprising four address lines.

As mentioned before, the inventive system for addressing serially connected devices and their racks used in the embodiment according to FIG. 2, may be extended to address a greater number of devices. If the scheme shown in FIG. 3 is extended to four address lines, $2 \times 4 = 8$ different addresses may be produced as shown in FIG. 4. Generally, if N address lines are used, 2N different addresses may be produced if all lines are cyclically displaced and in one of said lines an inverter is inserted.

It will be apparent that the embodiments of the invention as described and illustrated are only exemplary and that various modifications can be made within the scope of the invention as defined in the appended claims.

We claim:

1. A digitally addressable electronic device comprising:
   input means having at least first and second contacts;
      a transmission line connected to said first contact and a signal receiving line connected to said second contact;
      a first plurality of contacts provided for the connection of device address lines;
      a second plurality of contacts for the connection of a plurality of module address lines;
   device selection means having a plurality of inputs respectively connected to said first plurality of contacts for providing in response to a given combination of signals at said first plurality of contacts a control signal;
   output means having first and second contacts respectively coupled to said first and second contacts of said input means and a third plurality of contacts respectively coupled to said first plurality of contacts in such manner that at least two contacts of said third plurality are interchanged with respect to the corresponding contacts of said first plurality of contacts, one of said third plurality of contacts being connected to one of said first plurality of contacts via an invertor;
   a plurality of module connection means for coupling, when enabled, a module, when present, to said transmission line and said receiving line;
   module selection means coupled to said second plurality of contacts for providing an enabling signal to a module connection means determined by bits appearing at said second plurality of contacts when said control signal occurs;
   means providing an indication when a selected module is not coupled to a module connection means; and
   means responsive to said indication for connecting said signal transmission line to said signal reception line.

2. The device as set forth in claim 1 wherein said first and third pluralities of contacts are each comprised of a series of N contacts, each contact bearing a designation n, wherein N is an integer and n is defined by $1 \leq n \leq N$, each $n^{th}$ contact of the first plurality being directly connected to the $(n+1)^{th}$ contact of the third plurality with the exception of the $N^{th}$ contact of the first plurality which is connected to the $1^{st}$ contact of the third plurality via an inverter.

3. The device as set forth in claim 1, wherein said device is a medical monitoring device whose input means is adapted to be connected to a central monitoring station.

4. The device as set forth in claim 3, wherein said device has the form of a rack adapted to receive separate modules for the supervision of special body functions.

5. A digitally addressable electronic device comprising:
   input means having at least first and second contacts provided for the connection of a transmitting line and a receiving line, respectively;
   a first plurality of device address contacts provided for the connection of a plurality of device address lines;
   device selection means having a plurality of inputs respectively connected to the device address contacts and means for providing a control signal only in response to given signals on said device address contacts;
   output means having at least first and second contacts electrically coupled to said first and second contacts of said input means, respectively, and a second plurality of contacts connected to said first plurality of contacts in such a way that at least two contacts of said second plurality are interchanged with respect to the corresponding contacts of said first plurality so that the bit pattern of a device address signal at the output means is different from the bit pattern of a device address signal fed to the input means;
   an inverter inserted in at least one of the lines connecting one of said first plurality of contacts with one of said second plurality of contacts;
   normally conducting switch means coupled between the first contact of said input means and the second contact of said input means; and
   means for providing an indication when the input means of another device is coupled to said output means; and
   means responsive to said indication for causing said switch means to not conduct.

6. The device as set forth in claim 5 wherein the device selection means generates the control signal if all bits of an address signal applied to its input have the same value.

7. The device as set forth in claim 5 further comprising second switch means connected between the respective second contacts of said input means and said output means, said second switch means establishing a connection between said second contacts in in the absence of said control signal.

8. The device as set forth in claim 5, wherein at least one of said switch means is a gate means.

9. A digitally addressable electronic device comprising:
  an input means having a first sequence of contacts, a first plurality of contacts and first and second contacts;
  an output means having a second sequence of contacts corresponding to said first sequence of contacts, a second plurality of contacts corresponding to said first plurality of contacts, a third contact and a fourth contact;
  means respectively coupling contacts in said first sequence to contacts in said second sequence that are one position removed in a given direction from the positions of the contacts in said first sequence, the contact in an end position of said first sequence being coupled via an inverter to the contact at the opposite end of said second sequence;
  a plurality of pairs of terminals, one terminal of each pair being for connection to an input of a module and the other terminal of each pair being for connection to an output of a module;
  a first plurality of normally non-conducting switching means respectively coupled between said first contact of said input means and one terminal of each pair of terminals;
  a second plurality of normally non-conducting switching means respectively coupled between said second contact of said input means and the other terminal of each pair of terminals;
  a device selection means coupled to said first sequence of contacts for producing a device enabling signal at an output thereof in response to a given combination of bits appearing at said first sequence of contacts;
  means responsive to a device enabling signal for making the switching means coupled to a pair of terminals determined by bits at said first plurality of contacts conductive;
  means respectively coupling said first plurality of contacts to said second plurality of contacts;
  means coupling said first contact of said input means to said third contact of said output means; and
  means coupling said second contact of said input means to said fourth contact of said output means.

10. A digitally addressable electronic device as set forth in claim 9 further comprising:
  a third plurality of normally conductive switching means respectively coupled between the terminals of each pair of terminals; and
  means responsive to the connection of a module to each pair of terminals for rendering the one of said third plurality of switching means coupled between said terminals non conductive.

11. A digitally addressable electronic device as set forth in claim 9 further comprising:
  means responsive to said enabling signal for causing the coupling means between said first and third contacts to block the flow of signals.

12. A digitally addressable electronic device as set forth in claim 9 further comprising:
  means for providing an indication when another device is not coupled to said output means; and
  means responsive to said indication for connecting said first and second contacts in the absence of an enabling signal at the output of said device selection means.

13. Apparatus having a digitally addressable electronic device, said device comprising:
  input means having a first plurality of contacts for application of device address bits, said contacts being numbered in a sequence from 1 to n;
  output means having a second plurality of contacts, said latter contacts being numbered in sequence from 1 to n;
  means for respectively connecting contacts of said first plurality to a contact of the second plurality having the next number in said sequence with the exception that only the nth contact of said first plurality is coupled via an inverter to the contact of said second plurality that is first in said sequence;
  whereby a pattern of bits of a device address signal applied to the contacts of said first plurality is different relative to said sequence from the pattern of bits at contacts of the second plurality; and
  means responsive to the appearance of a given pattern of bits at one of said pluralities of contacts for providing a device enabling signal indicating that that device has been addressed.

* * * * *